(12) United States Patent
Kobayashi

(10) Patent No.: US 11,143,910 B2
(45) Date of Patent: Oct. 12, 2021

(54) LIGHTING DEVICE AND DISPLAY DEVICE

(71) Applicant: Funai Electric Co., Ltd., Osaka (JP)

(72) Inventor: Tomohiro Kobayashi, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/930,062

(22) Filed: Jul. 15, 2020

(65) Prior Publication Data
US 2021/0018797 A1 Jan. 21, 2021

(30) Foreign Application Priority Data
Jul. 19, 2019 (JP) .............................. JP2019-134024

(51) Int. Cl.
G02F 1/13357 (2006.01)
(52) U.S. Cl.
CPC .. *G02F 1/133603* (2013.01); *G02F 1/133605* (2013.01); *G02F 1/133606* (2013.01); *G02F 1/133608* (2013.01)
(58) Field of Classification Search
CPC ......... G02F 1/133605; G02F 1/133606; G02F 1/133608; G02F 2201/46; G02F 2201/54
See application file for complete search history.

(56) References Cited

U.S. PATENT DOCUMENTS

2018/0239195 A1* 8/2018 Kumamoto ............... F21S 2/00

FOREIGN PATENT DOCUMENTS

| EP | 3 318 793 A1 | 5/2018 |
| KR | 10-2017-0061535 A | 6/2017 |
| WO | 2017/038082 A1 | 3/2017 |

OTHER PUBLICATIONS

The extended European search report for the corresponding European application No. 20185898.2, dated Dec. 3, 2020.

* cited by examiner

Primary Examiner — Karabi Guharay
(74) Attorney, Agent, or Firm — Global IP Counselors, LLP

(57) ABSTRACT

A lighting device includes a plurality of light sources, a light diffusion plate, a sheet-like optical member, and a partition. The light diffusion plate is arranged opposite the light sources. The light diffusion plate diffuses light from the light sources. The optical member is disposed between the light diffusion plate and the light sources. The optical member includes a transmitting part that transmits the light emitted from the light sources and a reflecting part that reflects the light emitted from the light sources. The partition is arranged between adjacent light sources. The optical member is held by a support portion that is integrally provided to the partition and protrudes from an end portion of the partition toward the light diffusion plate.

20 Claims, 6 Drawing Sheets

LIGHTING DEVICE AND DISPLAY DEVICE

CROSS-REFERENCE TO RELATED APPLICATIONS

This application claims priority to Japanese Patent Application No. 2019-134024 filed on Jul. 19, 2019. The entire disclosure of Japanese Patent Application No. 2019-134024 is hereby incorporated herein by reference.

BACKGROUND

Field of the Invention

The invention relates to a lighting device and a display device.

Background Information

Conventionally, display devices are known (see International Publication WO 2017/038082 (Patent Literature 1), for example).

The above-described Patent Literature 1 discloses a display device that includes a light source, a sheet-like optical member that is disposed opposite the light source and includes a transmitting part that transmits the light emitted from the light source and a reflecting part that reflects the light emitted from the light source, and a reflective sheet that is disposed on the light source side with respect to the optical member and reflects the light emitted from the light source. With the display device of Patent Literature 1, a hollow partition that partitions adjacent light sources is formed by bending the reflective sheet. The sheet-like optical member is supported by a plurality of columnar support members that are disposed in recesses provided to the partition. In addition, in Patent Literature 1, in order to suppress the undulation of the sheet-like optical member, the plurality of the columnar support members are provided for each light source.

SUMMARY

However, in Patent Literature 1, in order to suppress the undulation of the sheet-like optical member, the plurality of the columnar support members are provided for each light source, which requires a large number of support members to support the optical member. Thus, there is a problem that the number of parts increases.

One object is to provide a lighting device and a display device with which it is possible to prevent the undulation of a sheet-like optical member while limiting the increase in the number of parts.

In view of the state of the known technology and in accordance with a first aspect of the present invention, a lighting device comprises a plurality of light sources, a light diffusion plate, a sheet-like optical member, and a partition. The light diffusion plate is arranged opposite the light sources. The light diffusion plate diffuses light from the light sources. The optical member is disposed between the light diffusion plate and the light sources. The optical member includes a transmitting part that transmits the light emitted from the light sources and a reflecting part that reflects the light emitted from the light sources. The partition is arranged between adjacent light sources. The optical member is held by a support portion that is integrally provided to the partition and protrudes from an end portion of the partition toward the light diffusion plate.

In view of the state of the known technology and in accordance with a second aspect of the present invention, a display device comprises a display panel, and a backlight disposed rearward of the display panel. The backlight emits light to the display panel. The backlight includes a plurality of light sources, a light diffusion plate, a sheet-like optical member, and a partition. The light diffusion plate is arranged opposite the light sources. The light diffusion plate diffuses light from the light sources. The optical member is disposed between the light diffusion plate and the light sources. The optical member includes a transmitting part that transmits the light emitted from the light sources and a reflecting part that reflects the light emitted from the light source. The partition is arranged between adjacent light sources. The optical member is held by a support portion that is integrally provided to the partition and protrudes from an end portion of the partition toward the light diffusion plate.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment (Configuration of Liquid Crystal Television Apparatus)

Referring to FIGS. 1 to 6, the configuration of a liquid crystal television apparatus 100 according to a first embodiment will be described. The liquid crystal television apparatus 100 is an example of the "display device" of the present disclosure.

Figure 1:
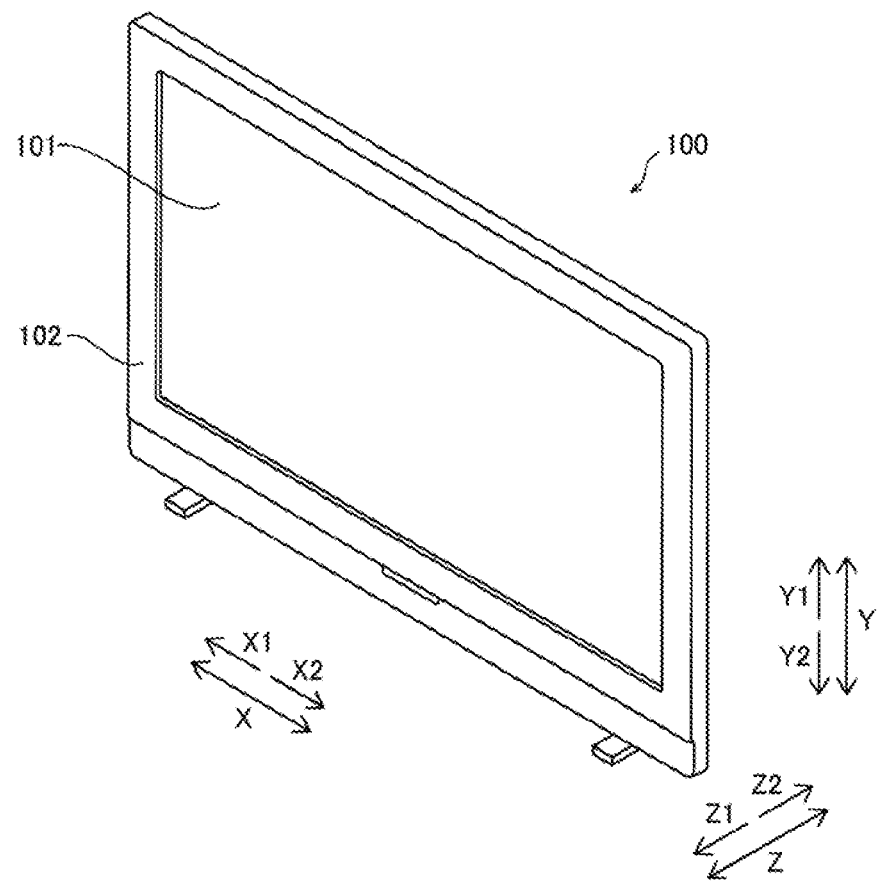
FIG. 1 is a perspective view showing the overall configuration of a liquid crystal television apparatus according to a first embodiment.
Figure 2:
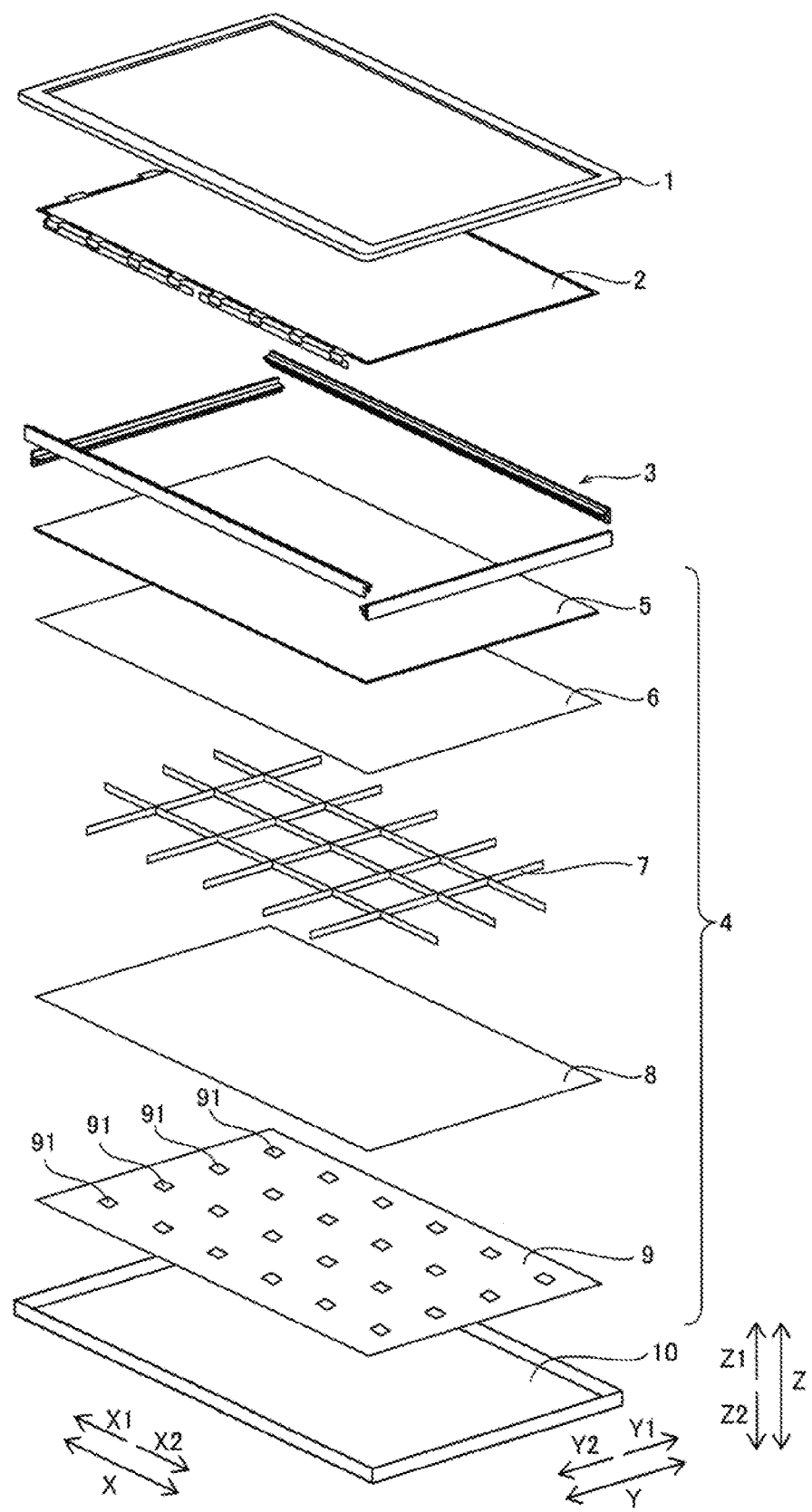
FIG. 2 is an exploded perspective view of the liquid crystal television apparatus in accordance with the first embodiment.

The liquid crystal television apparatus 100 according to the first embodiment includes, as shown in FIG. 1, a display section 101 and a housing 102. As shown in FIG. 2, the liquid crystal television apparatus 100 has a front housing 1, a display panel 2, an intermediate frame 3, a backlight 4, and a rear housing 10. The backlight 4 has a light diffusion plate 5, an optical member or optical sheet 6, a partition 7, a reflective sheet 8, and a substrate 9. The substrate 9 is provided with a plurality of light sources 91. The backlight 4 is an example of the "lighting device" of the present disclosure, and the reflective sheet 8 is an example of the "reflective member" of the present disclosure.

The front housing 1 is formed, for example, of a resin. The front housing 1 is configured to support the display panel 2 from the front side (Z1 direction side). In addition, a rectangular opening is provided in the center of the front housing 1 to expose a display surface of the display panel 2 on the front side (Z1 direction side).

The display panel 2 includes a liquid crystal cell. The display panel 2 includes a plurality of pixels, and by each of the plurality of pixels, images are displayed by changing the transmittance of light emitted from the light sources 91. The display panel 2 is driven based on video signal.

The intermediate frame 3 is configured to support the display panel 2 from the lateral side (X1 direction side and X2 direction side) and the vertical direction (Y1 direction side and Y2 direction side).

The backlight 4 is disposed on the back side or rearward (Z2 direction side) of the display panel 2. The backlight 4 is configured to emit light toward the display panel 2 from the back side of the display panel 2.

The light diffusion plate 5 has predetermined optical properties for diffusing the light from the light sources 91. The light diffusion plate 5 is configured in the form of a substantially rectangular plate. The light diffusion plate 5 is disposed between the display panel 2 and the light sources 91. The light diffusion plate 5 is disposed opposite the light sources 91. The light diffusion plate 5 is disposed at a location on the Z2 direction side of the display panel 2 so as to face a back surface of the display panel 2 in the Z direction. The light diffusion plate 5 is arranged so as to be sandwiched between the rear housing 10 and the intermediate frame 3 that supports the display panel 2.

The light diffusion plate 5 is formed by a resin. The light diffusion plate 5 is formed, for example, of polycarbonate. The light diffusion plate 5 has a thickness (Z direction length) of about a few millimeters (between 1 mm and 5 mm (i.e., 1 mm≤ the thickness of the light diffusion plate 5≤5 mm)). The light diffusion plate 5 has a larger thickness than the optical member 6.

Figure 3:
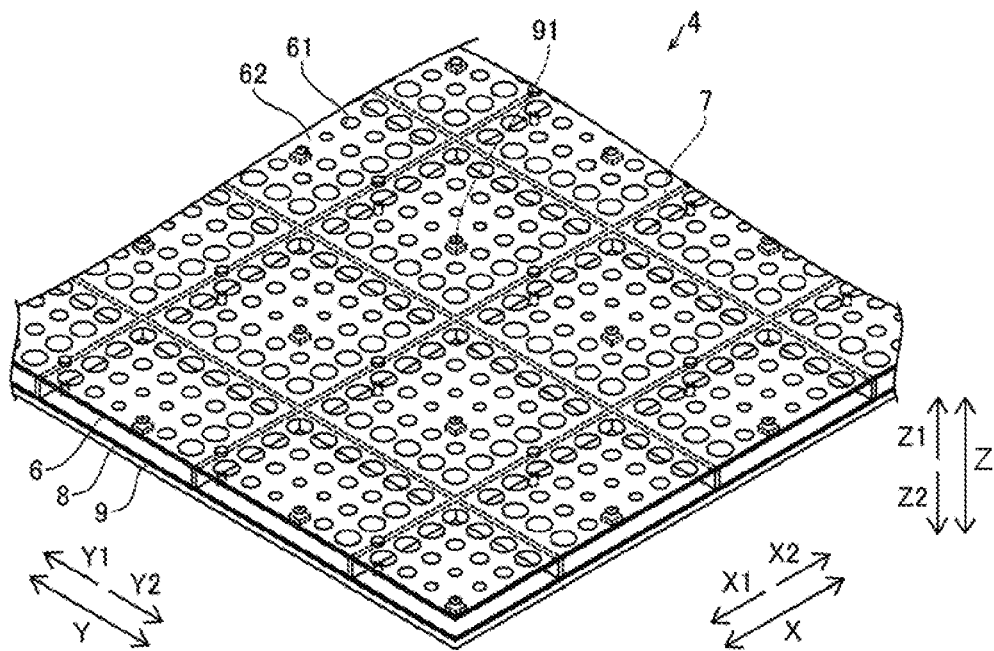
FIG. 3 is a perspective view showing an optical member and a partition of a backlight in accordance with the first embodiment.

The optical member 6 is disposed between the light diffusion plate 5 and the light sources 91. As shown in FIG. 3, the optical member 6 has a plurality of transmitting parts 61 that transmit the light emitted from the light sources 91, and a reflecting part 62 that reflects the light emitted from the light sources 91. The optical member 6 is formed in the form of a sheet, as shown in FIG. 2. The optical member 6 is disposed at a location on the Z2 direction side of the light diffusion plate 5 so as to face a back surface of the light diffusion plate 5 in the Z direction. The optical member 6 is arranged so as to be sandwiched between the rear housing 10 and the intermediate frame 3 that supports the display panel 2.

The optical member 6 is formed of a resin. The optical member 6 is formed, for example, of a micro-cellular formed plastic. The optical member 6 is formed of a micro-cellular foamed polyethylene terephthalate. The optical member 6 has a thickness T2 (Z direction length) of 0.8 mm or less. The optical member 6 has a smaller thickness than the light diffusion plate 5.

Figure 6:
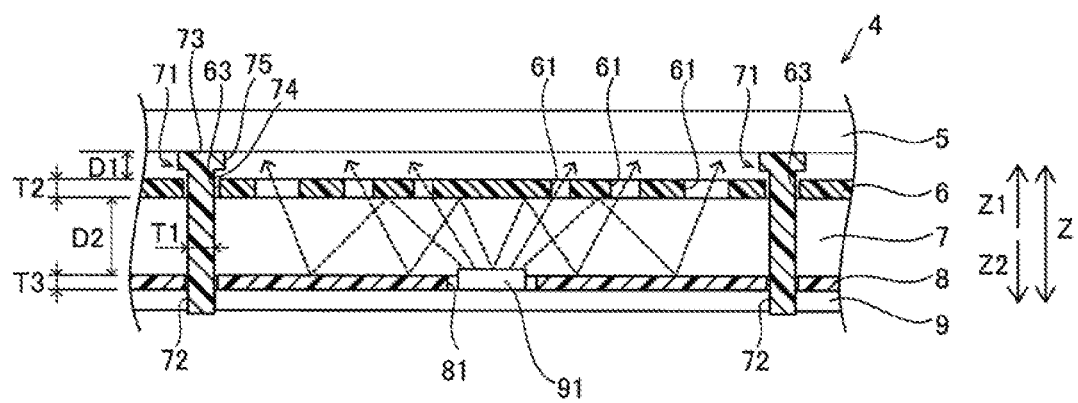
FIG. 6 is an enlarged cross-sectional view of the backlight according to the first embodiment.

The transmitting parts 61 of the optical member 6 each include a plurality of through holes that penetrate the optical member 6 in the thickness direction (Z direction) as shown in FIGS. 3 and 6. The plurality of the transmitting parts 61 are provided, and are arranged to have a predetermined pattern depending on a positional relationship relative to the light sources 91. Specifically, as shown in FIG. 3, the transmitting parts 61 are each provided for respective one of the light sources 91. Thus, the plurality of the through holes of each of the transmitting parts 61 are provided relative to the respective one of the light sources 91. Specifically, as shown in FIG. 3, the plurality of the through holes are circumferentially arranged along concentric rectangles (squares) that are concentric with respect to the respective one of the light sources 91, as viewed in Z direction. The plurality of the through holes also include different sizes of through holes. The reflecting part 62 of the optical member 6 is a portion (e.g., a remainder portion) of the optical member 6 other than where the through holes are provided. The reflecting part 62 is configured to reflect most of the incident light. The optical member 6 is configured to make the light emitted forward (Z1 direction) have a uniform light intensity in the plane direction (XY direction) by adjusting the transmission of the light by the transmitting part 61 at each position. The arrangement pattern of the plurality of the transmitting parts 61 shown in FIGS. 3 and 6 is schematically illustrated, but is not limited to the arrangement pattern shown in FIGS. 3 and 6.

Also, as shown in FIG. 6, the optical member 6 is arranged substantially in parallel with the light diffusion plate 5 and spaced apart from the light diffusion plate 5 by a predetermined spacing D1. For example, the optical member 6 is disposed spaced apart from the light diffusion plate 5 by the spacing D1 of 0.2 mm or more and 2 mm or less. This spacing D1 causes the light transmitted or reflected by the optical member 6 in the Z1 direction side to be diffused, and the light intensity becomes more uniform. The optical member 6 is arranged substantially in parallel with the reflective sheet 8 and spaced apart from the reflective sheet 8 by a predetermined spacing D2. For example, the optical member 6 is disposed spaced apart from the reflective sheet 8 by the spacing D2 of about several millimeters.

The optical member 6 also has a plurality of through holes 63 (see FIG. 6) as engagement portions to which support portions 71 are inserted, respectively.

Figure 4:
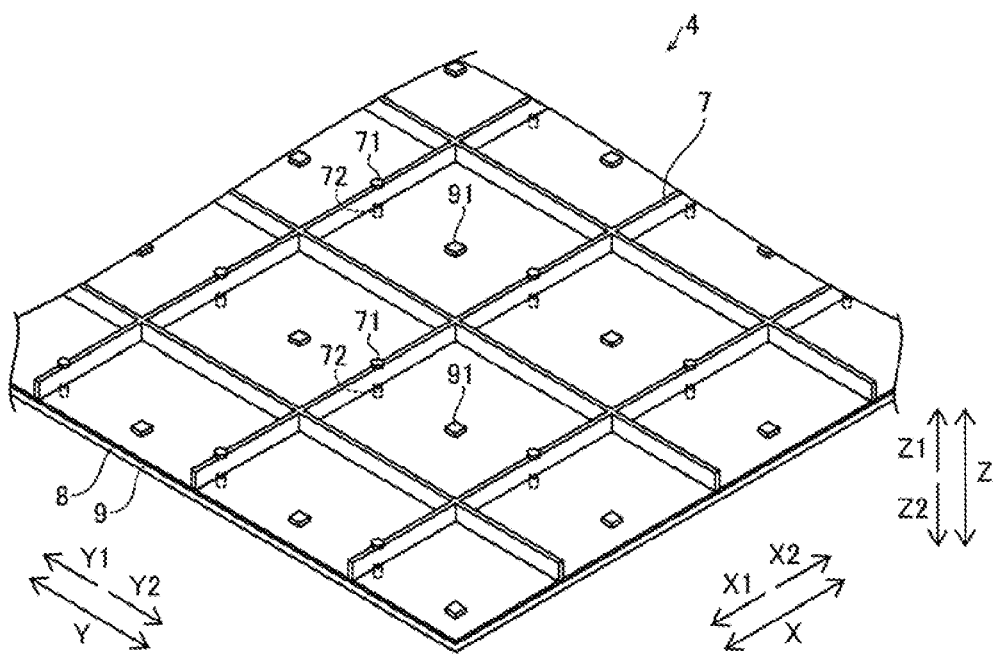
FIG. 4 is a perspective view showing the partition of the backlight according to the first embodiment.
Figure 5:
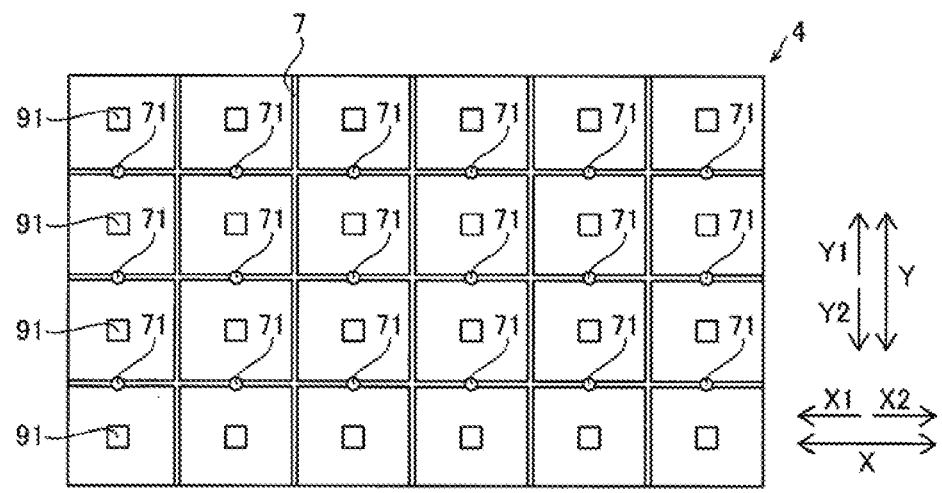
FIG. 5 is a front view of a support position of the optical member.

As shown in FIGS. 3 to 5, the partition 7 is disposed between adjacent light sources 91. Specifically, in the first embodiment, the partition 7 includes a lattice frame that defines a plurality of compartments corresponding to the light sources 91. The partition 7 divides between the light sources 91 so that each light source 91 is located in a different compartment from each other. The liquid crystal television apparatus 100 supports a local dimming that controls the brightness of each compartment divided by the partition 7. The liquid crystal television apparatus 100 adjusts the brightness of each light source 91 to match the color of the image.

The lattice frame of the partition 7 has a grid pattern dividing the compartments in the X and Y directions. The partition 7 has a predetermined length in the Z direction. The partition 7 is formed to divide each compartment into a rectangular shape.

The partition 7 is formed of a resin. The partition 7 is configured to reflect the light emitted from the light sources 91. Specifically, the partition 7 is formed of a resin having a color such as white or milky white. In the first embodiment, the partition 7 is formed as a one-piece, unitary member.

The partition 7 has a thickness T1 of 1 mm or more, as shown in FIG. 6. The partition 7 can be formed in a shape that tapers off toward the front (Z1 direction). In this case, the partition has a thickness T1 of 1 mm or more at the thinnest portion. The thickness T1 of the partition 7 is larger than the thickness T2 of the optical member 6. The thickness T1 of the partition 7 is also larger than a thickness T3 of the reflective sheet 8. The partition 7 is formed as a solid member (or in a solid shape).

As shown in FIG. 2, the reflective sheet 8 is disposed on an inner surface of the rear housing 10, and is configured to reflect the reflected return light from the optical member 6 to the front side (Z1 direction side). The reflective sheet 8 is disposed on the light source 91 side with respect to the optical member 6. As shown in FIG. 6, the reflective sheet 8 includes light source openings 81. The light sources 91 are arranged to protrude through the light source openings 81 to the optical member 6 side (Z1 direction side) of the reflective sheet 8.

The reflective sheet 8 is formed of a resin. The reflective sheet 8 is formed, for example, of a micro-cellular foamed plastic. The reflective sheet 8 is formed of a micro-cellular foamed polyethylene terephthalate. The reflective sheet 8 has the thickness T3 (Z direction length) of 0.8 mm or less.

The plurality of the light sources 91 are provided on the substrate 9. The substrate 9 is disposed on the back side (Z2 direction side) of the reflective sheet 8. The light sources 91 include a light-emitting element. The light sources 91 are configured to emit the light by being energized. The light sources 91 include, for example, a light emitting diode (LED). The light sources 91 are electrically coupled to the substrate 8 so as to be energized. The light sources 91 are supported by the rear housing 10 via the substrate 9. The plurality of the light sources 91 are, for example, arranged in a matrix in the XY directions, as shown in FIG. 5. In the first embodiment, as shown in FIGS. 2 and 5, the backlight 4 includes twenty-four light sources 91.

The rear housing 10 is configured to support the display panel 2 from the rear side (Z2 direction side), as shown in FIG. 2. The rear housing 10 is formed of metal, for example, and formed in a concave shape that is depressed in the rear direction (Z2 direction). The rear housing 10 is assembled with the front housing 1.

Here, in the first embodiment, the optical member 6 is held or supported by the support portions 71 that are integrally provided to the partition 7 so as to protrude from the end portion of the partition 7 on the light diffusion plate 5 side (Z1 direction side) of the partition 7, as shown in FIGS. 3 and 6. Specifically, the support portions 71 include convex portions 73 that protrude from the end portion (front end portion) of the partition 7 on the light diffusion plate 5 side (Z1 direction side) of the partition 7 toward the light diffusion plate 5. The optical member 6 includes the engagement portions (the through holes 63) that are engaged with the convex portions 73, respectively. In the first embodiment, the end portion (front end portion) of the partition 7, from which the support portions 71 protrude, lies on a single plane that is parallel to the XY plane. Also, the rear end portion of the partition 7 lies on a single plane that is parallel to the XY plane. Thus, the front and rear end portions of the partition 7 are parallel to each other.

More specifically, the convex portions 73 each include a shaft portion 74 that extends toward the light diffusion plate 5 side (Z1 direction side) from the partition 7 and a widening portion 75 that has a larger diameter than the shaft portion 74 and is disposed at the end of the shaft portion 74. While the convex portions 73 are inserted into the through holes 63 of the optical member 6, the widening portions 75 are formed by swaging the distal end portions of the shaft portions 74 of the convex portions 73. For example, the support portions 71 are swaged by ultrasonic swaging to form the widening portions 75. Here, swaging means deforming distal end portions of the convex portions 73 so that the convex portions 73 and the optical member 6 are engaged with each other. In the first embodiment, the convex portions 73 has circular cross-sectional shapes at any locations along the center axes of the convex portions 73, taken by planes perpendicular to the center axes of the convex portions 73, for example. However, the convex portions 73 can be configured to have different cross-sectional shapes other than the circular cross-sectional shapes. Also, in the first embodiment, with each of the support portions 71, the shaft portion 74 and the widening portion 75 are coaxially arranged with respect to each other.

As mentioned above, while the convex portions 73 are inserted into the through holes 63 in the optical member 6, the distal end portions are deformed to form the widening portions 75. This causes the support portions 71 to engage with the optical member 6. While the optical member 6 is disposed between the partition 7 and the widening portions 75 of the convex portion 73, the engagement portions (the through holes 63) of the optical member 6 are engaged with the shaft portions 74 and the widening portions 75 of the convex portions 73.

As shown in FIGS. 4 and 5, the support portions 71 are disposed between the plurality of the light sources 91. Specifically, in the first embodiment, the support portions 71 are disposed between the plurality of the light sources 91 in the Y direction. The support portions 71 are also disposed at locations on the edges between the intersections at which the portions of the partition 7 extending in the X direction and the portions of the partition 7 extending in the Y direction intersect with each other. That is, the support portions 71 are located at the ridges of the partition. The number of the support portions 71 is less than the number of the light sources 91. That is, one support portion 71 is disposed for a plurality of the light sources 91. In the first embodiment, as shown in FIG. 5, eighteen support portions 71 are provided to the backlight 4 for the twenty-four light sources. As mentioned above, in the first embodiment, the support portions 71 are disposed between the plurality of the light sources 91 in the Y direction. In other words, as shown in FIG. 5, the support portions 71 are disposed on the edges of the portions of the partition 7 extending in the X direction. However, the support portions 71 can be disposed on the edges of the portions of the partition 7 extending in the Y direction such that the support portions 71 are disposed between the plurality of the light sources 91 in the X direction.

As shown in FIG. 6, the widening portions 75 contact the light diffusion plate 5 and support the light diffusion plate 5. With this configuration, the light diffusion plate 5 and the optical member 6 are arranged substantially in parallel with each other and separated by the predetermined spacing D1. This forms a layer of air of a certain thickness with an optical diffusion effect between the optical member 6 and the light diffusion plate 5, and thus the increase of the thickness (Z direction length) can be suppressed while maintaining the uniformity of the brightness of the light exiting surface. In other words, because the sensitivity of robustness due to the positional shift between the light sources 91 and the optical member 6 in the XY direction is reduced, the degree of freedom in design can be ensured. This makes it possible to ensure the uniformity of the brightness even when the thickness is reduced.

The partition 7 is mounted to the substrate 9 on which the light sources 91 are disposed. Specifically, the partition 7 is mounted to the substrate 9 by a plurality of mounting portions 72 that are integrally provided to the partition 7 and protrude from the partition 7 to an opposite side of the support portions 71 (Z2 direction side) at positions corresponding to the support portions 71. The mounting portions 72 are mounted in engagement with the substrate 9. Specifically, the mounting portions 72 are inserted to engagement holes of the substrate 9, respectively.

Effects of First Embodiment

In the first embodiment, the following effects can be obtained.

In the first embodiment, as described above, the optical member 6 is held by the support portions 71 that are integrally provided to the partition 7 and protrudes from the end portion of the partition toward the light diffusion plate 5. This makes it possible to support the sheet-like optical member 6 by the support portions 71 that are integrally provided to the partition 7 while avoiding the undulation of the optical member 6, and thus there is no need to provide a large number of columnar support members to support the sheet-like optical member 6. As a result, the undulation of the sheet-like optical member 6 can be suppressed while the increase of the number of parts is suppressed. This allows the shape of the sheet-like optical member 6 to be maintained constant, and thus it is possible to suppress the occurrence of unevenness in the intensity of the irradiated light depending on the position. In addition, by providing the support portions 71 integrally on the partition 7 so as to protrude from the end portion of the partition toward the light diffusion plate 5, there is no need to provide a recess or notch in the partition 7 for arranging a support member to support the sheet-like optical member 6. Thus, it is possible to prevent that the light emitted from a light source 91 leak out of a recess or notch in the partition 7 to an adjacent light source 91 side, and thus it is possible to prevent a decrease in a brightness contrast performance in a local dimming that controls a brightness of each compartment partitioned by the partition 7.

In the first embodiment, as described above, the support portions 71 have the convex portions 73 that protrude from the end portion of the partition 7 toward the light diffusion plate 5 (Z1 direction side), and the optical member 6 has the engagement portions (the through holes 63) that engage the convex portions 73. With this configuration, the optical member 6 can be easily supported by engaging the convex portions 73 that are integrally provided to the partition 7 with the through holes 63 of the optical member 6.

Also, in the first embodiment, as described above, the convex portions 73 have the shaft portions 74 that extend from the partition 7 toward the light diffusion plate 5 (Z1 direction side) and the widening portions 75 that are disposed at the ends of the shaft portions 74 and have a larger diameter than the shaft portions 74, and the widening portions 75 are formed by swaging the distal end portions of the shaft portions 74 of the convex portions 73 while the convex portions 73 are inserted to the optical member 6. In this configuration, unlike the case where the optical member 6 is engaged with the convex portions 73 while deforming the optical member 6, the deformation of the optical member 6 can be suppressed, and thus the occurrence of the undulation due to the deformation of the optical member 6 can be suppressed.

Also, in the first embodiment, as described above, the widening portions 75 contact the light diffusion plate 5 and support the light diffusion plate 5. In this configuration, the light diffusion plate 5 can be supported by the widening portions 75 of the convex portions 73 supporting the optical member 6, and thus there is no need to separately provide a support member to support the light diffusion plate 5. As a result, the increase in the number of parts can be effectively suppressed.

Also, in the first embodiment, as described above, the partition 7 is formed as a solid member. With this configuration, unlike the case where the partition is formed in a hollow shape by folding a thin sheet-like member such as a reflective sheet or the like, the mechanical strength of the partition 7 can be increased, and thus even if the support portions 71 are integrally provided to the partition 7, the optical member 6 can be supported by the support portions 71 in a stable manner.

Also, in the first embodiment, as described above, the partition 7 has the thickness that is greater than that of the optical member 6. With this configuration, the mechanical strength of the partition 7 can be increased, and thus the partition 7 can be prevented from deforming. As a result, it is possible to effectively suppress the occurrence of unevenness in the intensity of the irradiated light depending on the position and the decrease in the brightness contrast performance in the local dimming due to the deformation of the partition 7. In addition, the mechanical strength of the partition 7 can be improved, and thus, even if the support portions 71 are integrally provided to the partition 7, the optical member 6 can be supported by the support portions 71 in a stable manner.

Also, in the first embodiment, as described above, the partition 7 is mounted to the substrate 9 on which the light sources 91 are disposed. In this configuration, the light sources 91 and the optical member 6 that is supported by the support portions 71 provided to the partition 7 are coupled to the common substrate 9, and thus the displacement of the positional relationship between the light sources 91 and the optical member 6 can be suppressed. As a result, it is possible to effectively suppress the occurrence of the unevenness in the intensity of the irradiated light depending on the position.

Also, in the first embodiment, as described above, the partition 7 is mounted to the substrate 9 by the mounting portions 72 that are integrally provided to the partition 7 and protrude from the partition 7 to an opposite side (Z2 direction side) of the support portions 71 at positions corresponding to the support portions 71. In this configuration, the partition 7 can be easily fixed to the substrate 9 by the mounting portions 72 integrally provided to the partition 7.

Also, in the first embodiment, as described above, the partition 7 has the thickness that is larger than that of the reflective sheet 8. With this configuration, the mechanical strength of the partition 7 can be increased, and thus the partition 7 can be prevented from deforming. As a result, it is possible to effectively suppress the occurrence of unevenness in the intensity of the irradiated light depending on the position and the decrease in the brightness contrast performance in the local dimming due to the deformation of the partition 7.

Second Embodiment

Next, referring to FIGS. 7 and 8, the configuration of a backlight 4 of a liquid crystal television apparatus 100 according to a second embodiment will be explained. In the second embodiment, unlike the first embodiment, an example of a configuration in which a bottom is provided to a partition. The liquid crystal television apparatus 100 is an example of the "display device" of the present disclosure, and the backlight 4 is an example of the "lighting device" of the present disclosure. In view of the similarity between the first and second embodiments, the parts of the second embodiment that are identical to or correspond to the parts of the first embodiment will be given the same reference numerals as the parts of the first embodiment. Moreover, the descriptions of the parts of the second embodiment that are identical to or correspond to the parts of the first embodiment may be omitted for the sake of brevity.

Figure 8:
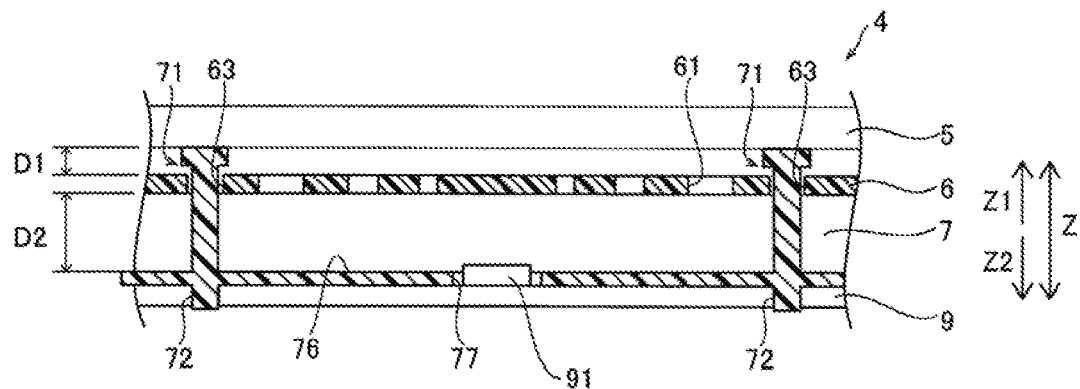
FIG. 8 is an enlarged cross-sectional view of the backlight according to the second embodiment.

Here, in the second embodiment, as shown in FIG. 8, an optical member 6 is supported by support portions 71 that are integrally provided to a partition 7 so as to protrude from an end portion of the partition 7 on a light diffusion plate 5 side (Z1 direction side) of the partition 7.

Figure 7:
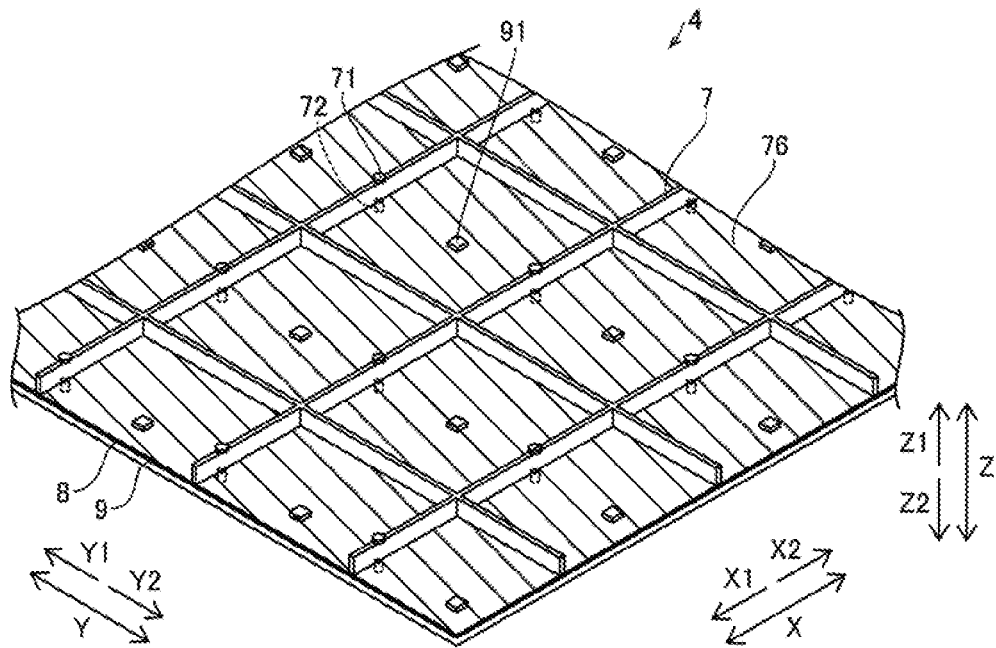
FIG. 7 is a perspective view of a partition of a backlight according to a second embodiment.

Also, in the second embodiment, as shown in FIGS. 7 and 8, the partition 7 is integrally provided with a bottom surface 76 on a light source 91 side (Z2 direction side). The bottom surface 76 is configured to reflect light emitted from the light sources 91. In other words, the bottom surface 76 has the same function as the reflective sheet 8 in the first embodiment. The bottom surface 76 has a white or milky white color that reflects the light well.

The bottom surface 76 includes light source openings 77. The light sources 91 are arranged to protrude through the light source openings 77 to the optical member 6 side (Z1 direction side) of the bottom surface 76.

Other configurations of the second embodiment are the same as the first embodiment above.

Effect of Second Embodiment

In the second embodiment, as in the first embodiment above, the optical member 6 is supported by the support portions 71 that are integrally provided with the partition 7 so as to protrude from the end portion of the partition 7 on the light diffusion plate 5 side (Z1 direction side) of the partition 7. With this configuration, the undulation of the sheet-like optical member 6 can be suppressed while the increase of the number of parts is suppressed.

Also, in the second embodiment, as described above, the partition 7 is integrally provided with the bottom surface 76 on the light source 91 side, and the bottom surface 76 is configured to reflect the light emitted from the light sources 91. With this configuration, there is no need to provide a separate reflective member that reflects light toward the optical member 6, and thus the increase in the number of parts can be effectively suppressed.

Other effects of the second embodiment are the same as in the first embodiment.

Third Embodiment

Figure 9:
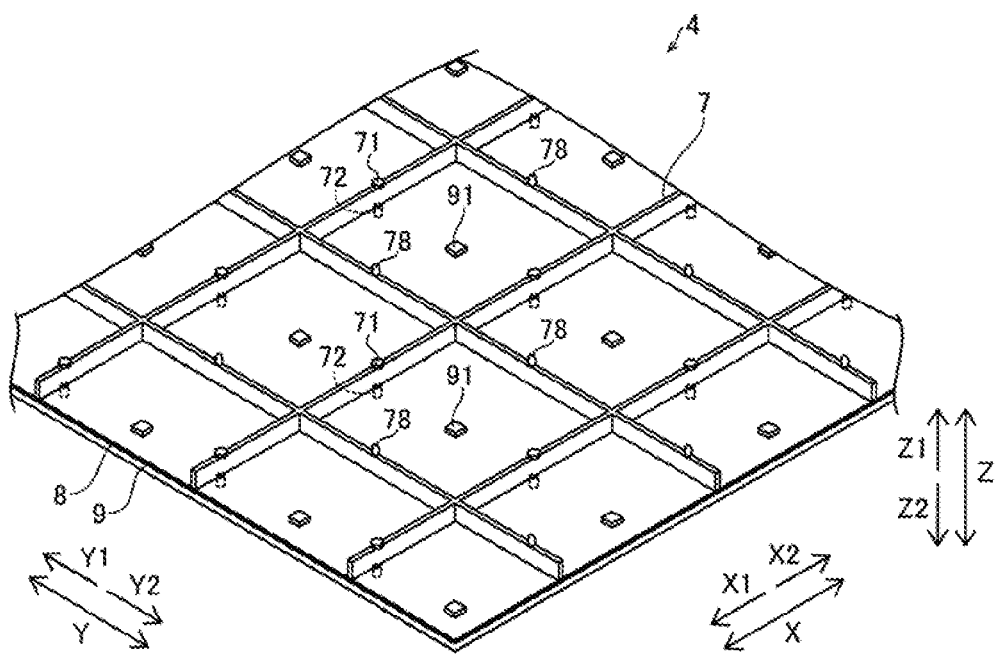
FIG. 9 is a perspective view of a partition of a backlight according to a third embodiment.

Next, referring to FIGS. 9 and 10, the configuration of a backlight 4 of a liquid crystal television apparatus 100 according to a third embodiment will be explained. In the third embodiment, unlike the first and second embodiments, an example of a configuration in which a light exiting surface is curved. The liquid crystal television apparatus 100 is an example of the "display device" of the present disclosure, and the backlight 4 is an example of the "lighting device" of the present disclosure. In view of the similarity between the first and third embodiments, the parts of the third embodiment that are identical to or correspond to the parts of the first embodiment will be given the same reference numerals as the parts of the first embodiment. Moreover, the descriptions of the parts of the third embodiment that are identical to or correspond to the parts of the first embodiment may be omitted for the sake of brevity.

Figure 10:
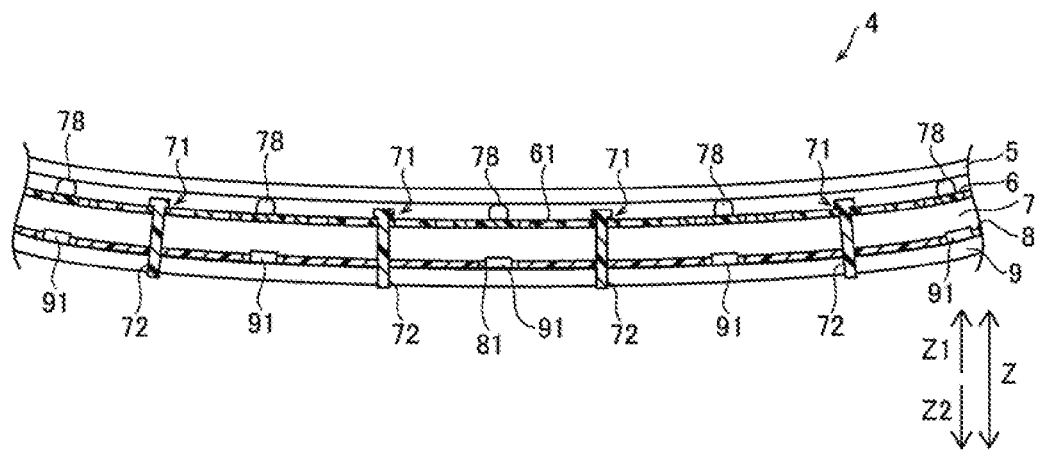
FIG. 10 is an enlarged cross-sectional view of the backlight according to the third embodiment.

Here, in the third embodiment, as shown in FIG. 10, an optical member 6 is supported by support portions 71 that are integrally provided to a partition 7 so as to protrude from an end portion of the partition 7 on a light diffusion plate 5 side (Z1 direction side) of the partition 7.

Also, in the third embodiment, as shown in FIG. 10, a light exiting surface of the backlight 4 from which the light from the backlight 4 exits to the front (Z1 direction side) is curved. In this case, a display surface of the display panel 2 that is disposed on the front side or forward (Z1 direction side) of the backlight 4 is also curved in the same manner as in the backlight 4. The backlight 4 is curved such that the vicinity of the center portion is disposed backward (Z2 direction side) and the outer peripheral portion is disposed forward (Z1 direction side).

Also, in the third embodiment, the partition 7 is provided with a plurality of boss portions 78 separately from the support portions 71. The boss portions 78 contact the light diffusion plate 5 and support the light diffusion plate 5. With this configuration, the light diffusion plate 5 and the optical member 6 are arranged substantially in parallel to each other and separated by a predetermined spacing. The boss portions 78 are integrally provided to the partition 7 at locations spaced apart from the support potions 71 and protrude from the end portion of the partition on the light diffusion plate 5 side (Z1 direction side) of the partition 7, as shown in FIG. 9.

The boss portions 78 are disposed at locations on the edges between the intersections at which the portions of the partition 7 extending in the X direction and the portions of the partition 7 extending in the Y direction intersect with each other. That is, the boss portions 78 are located at the ridges of the partition 7.

The distal end potions of the boss portions 78 that contact the light diffusion plate 5 have a curved shape. Specifically, the distal end portions of the boss portions 78 have a hemispherical shape. This enables the boss portions 78 to support the light diffusion plate 5 by point contact, and thus it is possible to precisely maintain the spacing between the light diffusion plate 5 and the optical member 6. The boss portions 78 are inserted into through holes provided in the optical member 6. Steps having a larger diameter than the through holes are formed on the partition 7 side of the boss portions 78, and the leakage of light from the through holes in which the boss portions 78 are inserted is suppressed.

Other configurations of the third embodiment are the same as the first embodiment above.

Effect of Third Embodiment

In the third embodiment, as in the first embodiment above, the optical member 6 is supported by the support portions 71 that are integrally provided with the partition 7 so as to protrude from the end portion of the partition 7 on the light diffusion plate 5 side (Z1 direction side) of the partition 7. With this configuration, the undulation of the sheet-like optical member 6 can be suppressed while the increase of the number of parts is suppressed.

Other effects of the third embodiment are the same as in the first embodiment.

Modification Examples

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first to third embodiments above, examples of the liquid crystal television apparatus are illustrated as a display device of the present invention, but the present invention is not limited to this. For example, the present invention can be applied to a display device other than a liquid crystal television apparatus. For example, a general display device such as a display device for personal computers (PC).

Also, in the first to third embodiments above, examples of the backlights are illustrated as a lighting device of the present invention, but the present invention is not limited to this. For example, the present invention can be applied to a lighting device other than a backlight of a display device. For example, the present invention can be applied to a lighting device with plane light emission.

Also, in the first to third embodiments above, examples of the configuration in which the support portions are formed by swaging are illustrated, but the present invention is not limited to this. In the present invention, the support portions can be formed by resin molding or by thermal deformation. The support portions can be formed by a swaging method other than the ultrasonic swaging.

Also, in the first to third embodiments above, examples of the configuration in which the partition is formed to divide the compartments into a rectangular shape are illustrated, but the present invention is not limited to this. In the present invention, the partition can be formed to divide the compartments into polygonal shapes other than quadrangle (rectangular). The partition can also be formed to divide the compartments in a curved shape.

Also, in the first to third embodiments above, examples of the configuration in which the support portions are disposed between the intersections of the partition are illustrated, but the present invention is not limited to this. In the present invention, the support portions can be disposed on the intersections of the partition.

Also, in the first and second embodiments above, examples of the configuration in which the light diffusion plate is supported by the support portions that support the optical member are illustrated, but the present invention is not limited this. In the present invention, separately from the support portions that support the optical member, portions that support the light diffusion plate can be integrally provided to the partition.

Also, in the first to third embodiments above, examples of the configuration in which the rear frame is made to support the light diffusion plate are illustrated, but the present invention is not limited to this. In the present invention, a retaining member for the light diffusion plate can be provided separately from the rear frame, and the light diffusion plate can be supported by the retaining member for the light diffusion plate. In this case, the rear frame can support the retaining member for the light diffusion plate.

Also, in the first to third embodiments above, examples of the configuration in which the plurality of the light sources are arranged in a matrix in the XY directions are illustrated, but the present invention is not limited to this. In the present invention, for example, a plurality of light sources can be arranged in a row or in a staggered manner. A plurality of light sources can be arranged according to a predetermined rule.

[1] In view of the state of the known technology and in accordance with a first aspect of the present invention, a lighting device comprises a plurality of light sources, a light diffusion plate, a sheet-like optical member, and a partition. The light diffusion plate is arranged opposite the light sources. The light diffusion plate is configured to diffuse light from the light sources. The optical member is disposed between the light diffusion plate and the light sources. The optical member includes a transmitting part that is configured to transmit the light emitted from the light sources and a reflecting part that is configured to reflect the light emitted from the light sources. The partition is arranged between adjacent light sources. The optical member is held by a support portion that is integrally provided to the partition and protrudes from an end portion of the partition toward the light diffusion plate.

In the lighting device according to the first aspect of this invention, the optical member is held by the support portion that is integrally provided to the partition and protrudes from the end portion of the partition toward the light diffusion plate. This makes it possible to support the sheet-like optical member by the support portion that is integrally provided to the partition while avoiding the undulation of the optical member, and thus there is no need to provide a large number of columnar support members to support the sheet-like optical member. As a result, the undulation of the sheet-like optical member can be suppressed while the increase of the number of parts is suppressed. This allows the shape of the sheet-like optical member to be maintained constant, and thus it is possible to suppress the occurrence of unevenness in the intensity of the irradiated light depending on the position. In addition, by providing the support portion integrally on the partition so as to protrude from the end portion of the partition toward the light diffusion plate, there is no need to provide a recess or notch in the partition for arranging a support member to support the sheet-like optical member. Thus, it is possible to prevent that the light emitted from a light source leak out of a recess or notch in the partition to an adjacent light source side, and thus it is possible to prevent a decrease in a brightness contrast performance in a local dimming that controls a brightness of each compartment partitioned by the partition.

[2] In accordance with a preferred embodiment according to the lighting device mentioned above, the support portion preferably has a convex portion that protrudes from the end portion of the partition toward the light diffusion plate, and the optical member has an engagement portion that engages the convex portion. With this configuration, the optical member can be easily supported by engaging the convex portion that is integrally provided to the partition with the engagement portion of the optical member.

[3] In accordance with a preferred embodiment according to any one of the lighting devices mentioned above, the convex portion preferably has a shaft portion that extends from the partition toward the light diffusion plate and a widening portion that is disposed at an end of the shaft portion and has a larger diameter than the shaft portion, and the widening portion is formed by swaging an end portion of the shaft portion of the convex portion while the convex portion is inserted to the optical member. In this configuration, unlike the case where the optical member is engaged with the convex portion while deforming the optical member, the deformation of the optical member can be suppressed, and thus the occurrence of the undulation due to the deformation of the optical member can be suppressed.

[4] In accordance with a preferred embodiment according to any one of the lighting devices mentioned above, in the configuration in which the above-described convex portion has the shaft portion and the widening portion, the widening portion preferably contacts the light diffusion plate and supports the light diffusion plate. In this configuration, the light diffusion plate can be supported by the widening portion of the convex portion supporting the optical member, and thus there is no need to separately provide a support member to support the light diffusion plate. As a result, the increase in the number of parts can be effectively suppressed.

[5] In accordance with a preferred embodiment according to any one of the lighting devices mentioned above, the partition is preferably formed as a solid member. With this configuration, unlike the case where the partition is formed in a hollow shape by folding a thin sheet-like member such as a reflective sheet or the like, the mechanical strength of the partition can be increased, and thus even if the support portion is integrally provided to the partition, the optical member can be supported by the support portion in a stable manner.

[6] In accordance with a preferred embodiment according to any one of the lighting devices mentioned above, the partition preferably has a thickness that is larger than that of the optical member. With this configuration, the mechanical strength of the partition can be increased, and thus the partition can be prevented from deforming. As a result, it is possible to effectively suppress the occurrence of unevenness in the intensity of the irradiated light depending on the position and the decrease in the brightness contrast performance in the local dimming due to the deformation of the partition. In addition, the mechanical strength of the partition can be improved, and thus, even if the support portion is integrally provided to the partition, the optical member can be supported by the support portion in a stable manner.

[7] In accordance with a preferred embodiment according to any one of the lighting devices mentioned above, the partition is preferably mounted to a substrate on which the light sources are disposed. In this configuration, the light sources and the optical member that is supported by the support portion provided to the partition are coupled to a common substrate, and thus the displacement of the positional relationship between the light sources and the optical member can be suppressed. As a result, it is possible to effectively suppress the occurrence of the unevenness in the intensity of the irradiated light depending on the position.

[8] In accordance with a preferred embodiment according to any one of the lighting devices mentioned above, the partition is mounted to the substrate by a mounting portion that is integrally provided to the partition and protrudes from the partition to an opposite side of the support portion at a position corresponding to the support portion. In this configuration, the partition can be easily fixed to the substrate by the mounting portion integrally provided to the partition.

[9] In accordance with a preferred embodiment according to any one of the lighting devices mentioned above, the lighting device preferably further comprises a reflective member disposed on a light source side with respect to the optical member, the reflective member being configured to reflect the light emitted from the light sources, the partition having a thickness that is larger than that of the reflective member. With this configuration, the mechanical strength of the partition can be increased, and thus the partition can be prevented from deforming. As a result, it is possible to effectively suppress the occurrence of unevenness in the intensity of the irradiated light depending on the position and the decrease in the brightness contrast performance in the local dimming due to the deformation of the partition. In addition, the mechanical strength of the partition can be improved, and thus, even if the support portion is integrally provided to the partition, the optical member can be supported by the support portion in a stable manner.

[10] In accordance with a preferred embodiment according to any one of the lighting devices mentioned above, the partition is preferably integrally provided with a bottom surface on a light source side, and the bottom surface is configured to reflect the light emitted from the light sources. With this configuration, there is no need to provide a separate reflective member that reflects light toward the optical member, and thus the increase in the number of parts can be effectively suppressed.

[11] In view of the state of the known technology and in accordance with a second aspect of the present invention, a display device comprises a display panel, and a backlight disposed rearward of the display panel. The backlight is configured to emit light to the display panel. The backlight includes a plurality of light sources, a light diffusion plate, a sheet-like optical member, and a partition. The light diffusion plate is arranged opposite the light sources. The light diffusion plate is configured to diffuse light from the light sources. The optical member is disposed between the light diffusion plate and the light sources. The optical member includes a transmitting part that is configured to transmit the light emitted from the light sources and a reflecting part that is configured to reflect the light emitted from the light source. The partition is arranged between adjacent light sources. The optical member is held by a support portion that is integrally provided to the partition and protrudes from an end portion of the partition toward the light diffusion plate.

In the display device according to the second aspect of this invention, the optical member is held by the support portion that is integrally provided to the partition and protrudes from the end portion of the partition toward the light diffusion plate. This makes it possible to support the sheet-like optical member by the support portion that is integrally provided to the partition while avoiding the undulation of the optical member, and thus there is no need to provide a large number of columnar support members to support the sheet-like optical member. As a result, the undulation of the sheet-like optical member can be suppressed while the increase of the number of parts is suppressed. This allows the shape of the sheet-like optical member to be maintained constant, and thus it is possible to suppress the occurrence of unevenness in the intensity of the irradiated light depending on the position. In addition, by providing the support portion integrally on the partition so as to protrude from the end portion of the partition toward the light diffusion plate, there is no need to provide a recess or notch in the partition for arranging a support member to support the sheet-like optical member. Thus, it is possible to prevent that the light emitted from a light source leak out of a recess or notch in the partition to an adjacent light source side, and thus it is possible to prevent a decrease in a brightness contrast performance in a local dimming that controls a brightness of each compartment partitioned by the partition.

[12] In accordance with a preferred embodiment according to the display device mentioned above, the support portion preferably has a convex portion that protrudes from the end portion of the partition toward the light diffusion plate, and the optical member has an engagement portion that engages the convex portion. With this configuration, the optical member can be easily supported by engaging the convex portion that is integrally provided to the partition with the engagement portion of the optical member.

[13] In accordance with a preferred embodiment according to any one of the display devices mentioned above, the convex portion preferably has a shaft portion that extends from the partition toward the light diffusion plate and a widening portion that is disposed at an end of the shaft portion and has a larger diameter than the shaft portion, and the widening portion is formed by swaging an end portion of the shaft portion of the convex portion while the convex portion is inserted to the optical member. In this configuration, unlike the case where the optical member is engaged with the convex portion while deforming the optical member, the deformation of the optical member can be suppressed, and thus the occurrence of the undulation due to the deformation of the optical member can be suppressed.

[14] In accordance with a preferred embodiment according to any one of the display devices mentioned above, in the configuration in which the above-described convex portion has the shaft portion and the widening portion, the widening portion preferably contacts the light diffusion plate and supports the light diffusion plate. In this configuration, the light diffusion plate can be supported by the widening portion of the convex portion supporting the optical member, and thus there is no need to separately provide a support member to support the light diffusion plate. As a result, the increase in the number of parts can be effectively suppressed.

[15] In accordance with a preferred embodiment according to any one of the display devices mentioned above, the partition is preferably formed as a solid member. With this configuration, unlike the case where the partition is formed in a hollow shape by folding a thin sheet-like member such as a reflective sheet or the like, the mechanical strength of the partition can be increased, and thus even if the support portion is integrally provided to the partition, the optical member can be supported by the support portion in a stable manner.

[16] In accordance with a preferred embodiment according to any one of the lighting devices mentioned above, the transmitting part of the optical member includes a plurality of through holes arranged relative to each of the light sources.

[17] In accordance with a preferred embodiment according to any one of the lighting devices mentioned above, the reflecting part of the optical member includes a remainder portion of the optical member other than the through holes.

[18] In accordance with a preferred embodiment according to any one of the lighting devices mentioned above, the shaft portion and the widening portion are coaxially arranged with respect to each other.

[19] In accordance with a preferred embodiment according to any one of the lighting devices mentioned above, the partition includes a lattice frame that defines a plurality of compartments corresponding to the light sources.

[20] In accordance with a preferred embodiment according to any one of the lighting devices mentioned above, the light diffusion plate is supported by a boss portion that is integrally provided to the partition at a location spaced apart from the support portion and protrudes from the end portion of the partition toward the light diffusion plate.

According to the present invention, as described above, it is possible to prevent the undulation of the sheet-like optical member while limiting the increase in the number of parts.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a liquid crystal television apparatus in an upright position. Accordingly, these directional terms should be interpreted relative to a liquid crystal television apparatus in an upright position on a horizontal surface.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lighting device comprising:
   a plurality of light sources;
   a light diffusion plate arranged opposite the light sources, the light diffusion plate diffusing light from the light sources;
   a sheet-like optical member disposed between the light diffusion plate and the light sources, the optical member including a transmitting part that transmits the light emitted from the light sources and a reflecting part that reflects the light emitted from the light sources; and
   a partition wall arranged between adjacent light sources, the partition wall entirely surrounding each of the light sources to independently partition the light sources relative to each other,
   the optical member being disposed on a top surface of the partition wall and held by a support portion that is integrally provided to the partition wall and extends from the top surface of the partition wall toward the light diffusion plate.

2. The lighting device according to claim 1, wherein
   the support portion has a convex portion that extends from the top surface of the partition wall toward the light diffusion plate, and
   the optical member has an engagement portion that engages the convex portion.

3. The lighting device according to claim 2, wherein
   the convex portion has a shaft portion that extends from the partition wall toward the light diffusion plate and a widening portion that is disposed at an end of the shaft portion and has a larger diameter than the shaft portion, and
   the widening portion is formed by swaging an end portion of the shaft portion of the convex portion while the convex portion is inserted to the optical member.

4. The lighting device according to claim 3, wherein
   the widening portion contacts the light diffusion plate and supports the light diffusion plate.

5. The lighting device according to claim 3, wherein
   the shaft portion and the widening portion are coaxially arranged with respect to each other.

6. The lighting device according to claim 1, wherein
   the partition wall is formed as a solid member.

7. The lighting device according to claim 1, wherein
   the partition wall has a thickness that is larger than that of the optical member.

8. The lighting device according to claim 1, wherein
   the partition wall is mounted to a substrate on which the light sources are disposed.

9. The lighting device according to claim 8, wherein
   the partition wall is mounted to the substrate by a mounting portion that is integrally provided to the partition wall and protrudes from the partition wall to an opposite side of the support portion at a position corresponding to the support portion.

10. The lighting device according to claim 1, further comprising
    a reflective member disposed on a light source side with respect to the optical member, the reflective member reflecting the light emitted from the light sources,
    the partition wall having a thickness that is larger than that of the reflective member.

11. The lighting device according to claim 1, wherein
    the partition wall is integrally provided with a bottom surface on a light source side, and
    the bottom surface reflects the light emitted from the light sources.

12. The lighting device according to claim 1, wherein
    the transmitting part of the optical member includes a plurality of through holes arranged relative to each of the light sources.

13. The lighting device according to claim 12, wherein
    the reflecting part of the optical member includes a remainder portion of the optical member other than the through holes.

14. The lighting device according to claim 1, wherein
    the partition wall includes a lattice frame that defines a plurality of compartments corresponding to the light sources.

15. The lighting device according to claim 1, wherein
    the light diffusion plate is supported by a boss portion that is integrally provided to the partition wall at a location spaced apart from the support portion and extends from the top surface of the partition wall toward the light diffusion plate.

16. A display device comprising:
    a display panel; and
    a backlight disposed rearward of the display panel, the backlight emitting light to the display panel, the backlight including
    a plurality of light sources,
    a light diffusion plate that is arranged opposite the light sources, the light diffusion plate diffusing light from the light sources,
    a sheet-like optical member that is disposed between the light diffusion plate and the light sources, the optical member including a transmitting part that transmits the light emitted from the light sources and a reflecting part that reflects the light emitted from the light sources, and
    a partition wall that is arranged between adjacent light sources, the partition wall entirely surrounding each of the light sources to independently partition the light sources relative to each other,
    the optical member being disposed on a top surface of the partition wall and held by a support portion that is integrally provided to the partition wall and extends from the top surface of the partition wall toward the light diffusion plate.

17. The display device according to claim 16, wherein
    the support portion has a convex portion that extends from the top surface of the partition wall toward the light diffusion plate, and
    the optical member has an engagement portion that engages the convex portion.

18. The display device according to claim 17, wherein
    the convex portion has a shaft portion that extends from the partition wall toward the light diffusion plate and a widening portion that is disposed at an end of the shaft portion and has a larger diameter than the shaft portion, and
    the widening portion is formed by swaging an end portion of the shaft portion of the convex portion while the convex portion is inserted to the optical member.

19. The display device according to claim 18, wherein
    the widening portion contacts the light diffusion plate and supports the light diffusion plate.

20. The display device according to claim 16, wherein
    the partition wall is formed as a solid member.

* * * * *